United States Patent [19]

Mount, II

[11] Patent Number: 4,685,140
[45] Date of Patent: Aug. 4, 1987

[54] KERATOGRAPH AUTOSCANNER SYSTEM

[75] Inventor: Houston B. Mount, II, Tulsa, Okla.

[73] Assignee: Kera Corporation, Santa Clara, Calif.

[21] Appl. No.: 624,650

[22] Filed: Jun. 26, 1984

[51] Int. Cl.[4] .............................................. G06K 9/00
[52] U.S. Cl. ......................................... 382/6; 351/212; 354/62; 382/57; 382/65
[58] Field of Search ................... 354/62; 351/212, 206, 351/211; 382/6, 65, 1, 2, 57; 364/413; 340/709, 710; 356/376, 377, 395, 397

[56] References Cited

U.S. PATENT DOCUMENTS

| | | | |
|---|---|---|---|
| 3,264,932 | 8/1966 | Hendricks | 351/212 |
| 3,797,921 | 3/1974 | Kilmer et al. | 351/206 |
| 3,804,528 | 4/1974 | Kilmer et al. | 351/206 |
| 4,019,813 | 4/1977 | Cornsweet et al. | 351/212 |
| 4,109,237 | 8/1978 | Hill | 382/2 |
| 4,429,960 | 2/1984 | Mocilac et al. | 351/212 |
| 4,490,022 | 12/1984 | Reynolds | 351/212 |
| 4,523,820 | 6/1985 | Kaakinen | 354/62 |
| 4,525,858 | 6/1985 | Cline et al. | 382/1 |
| 4,569,576 | 2/1986 | Karpov | 351/212 |

OTHER PUBLICATIONS

*Ophthalmology Times*, vol. 8, No. 7, Apr. 1, 1983, p. 11.

Primary Examiner—Leo H. Boudreau
Assistant Examiner—Joseph Mancuso
Attorney, Agent, or Firm—Flehr, Hohbach, Test, Albritton & Herbert

[57] ABSTRACT

A computer-controlled system for displaying an image of a keratograph taken by a video camera on a video monitor and determining the position/dimensions of the Placido rings on the keratograph, then selectively correcting the measured data. An interface circuit is provided which digitizes and stores in the computer memory one video scan line at a time, and contains ring data storage and logic for superimposing ring data on the keratograph image.

16 Claims, 13 Drawing Figures

SCAN SET UP
FIG-6

VERIFY MODE
FIG-7

EDIT MODE
FIG-8

PATIENT NAME: L
DATE: L
EYE: LEFT
RX - SPH: L  CYL: L  AXIS: L
IOP: L
DOCTOR: L

FIG-13

```
                        -9-         8.13                              8.02
         8.05          -8-          8.21                        8.15
     8.00             -7-           8.24                     8.11
        8.08         -6-            8.28                   8.21
          8.02      -5-             8.33                 8.33
             8.12  -4-              8.41              8.41
               8.26 -3-             8.41           8.41
                  8.62 -2-          8.21         8.21
                    8.65            8.08       8.08
                       8.72
NASAL                                                                 TEMPORAL
 8.05   8.01   8.12   8.62   8.72       7.67   8.62   8.39   8.08   8.10
    8.06   8.02   8.26   8.65              8.12   8.58   8.17   8.06
                       8.34         7.94
                    8.76         8.34
                                 8.76 -2- 8.12
                    8.41            8.41     8.62
                 8.20               8.20  -3-   8.47
              8.07                  7.98  -4-     8.21
           7.76                     7.83   -5-  8.17
        7.84                        7.84    -6-   8.08
     7.79                           7.79     -7-    8.06
  7.75                              7.75      -8-     8.10
                                              -9-
```

KERATOGRAPH AUTOSCANNER SYSTEM

BACKGROUND OF THE INVENTION

This invention relates to a system for measuring the dimensions of a cornea, either indirectly from a keratograph or directly from the cornea itself. In particular, the invention involves a system which uses computer-controlled digitization and analysis of video image information to provide fast, accurate corneal measurements.

For several decades, measurement of the human cornea has been obtained through the use of the keratometer. The keratometer measures an area 2.5 mm to 3.5 mm in diameter centered on the visual axis, and provides accurate measurements of the cornea's sagittal height and diameter, but is incapable of providing accurate readings of the intervening dimensions which are helpful to accurate diagnosis and contact lens prescription.

The Corneascope, the subject of U.S. Pat. No. 3,797,921 was developed to provide greater flexibility and accuracy in measuring the cornea. The Corneascope is designed to measure the diameter of the cornea using Placido rings which are spaced at increasing depths or increments starting at approximately 0.1 mm from the corneal apex. The Placido rings are reflected from the cornia and superimposed on a color photograph of the cornea to produce a keratograph of, typically, nine rings which are spaced from 0.1 mm to 3.5 mm from the corneal apex. See corneal photograph/keratograph 10 in FIG. 1 and the rings 11—11 therein. In terms of functional results, the Corneascope is an improved keratometer which provides a photograph of mire reflections at spaced depths along the corneal surface.

The Comparator described in U.S. Pat. No. 3,804,528 is used for analyzing the information provided by keratographs. The Comparator compares the keratograph of a patient's cornea to photographs of Placido rings reflected off base curves of known radii for the purposes of reading the corneal radii associated with the keratograph rings. The Comparator provides the optical zone diameter and base curves needed to fit a selected area of the cornea; clearance and touch points of the selected base curve; as well as the associated fluorscein pattern.

Among other benefits, the Corneascope and the Comparator provide a permanent photographic mold of the cornea and accurate determination of crucial corneal dimensions necessary for lens prescription, surgery and other diagnostic needs. Experience in using the Corneascope and the Comparator has indicated the need for a system which is an alternative to or an adjunct to the Comparator for even more fully and quickly quantifying the type of information contained in keratographs.

A computerized operating keratometer has been illustrated in *Ophthalmology Times,* vol. 8, No. 7, Apr. 1, 1983, p. 71, and is believed representative of computer systems which are used to quickly digitize and analyze an image of the cornea or a keratograph to thereby provide numeric measurements. The particular system comprises a surgical microscope which interfaces optically with a video camera and a ring light of an image processor, and a TV monitor.

Figure 2:
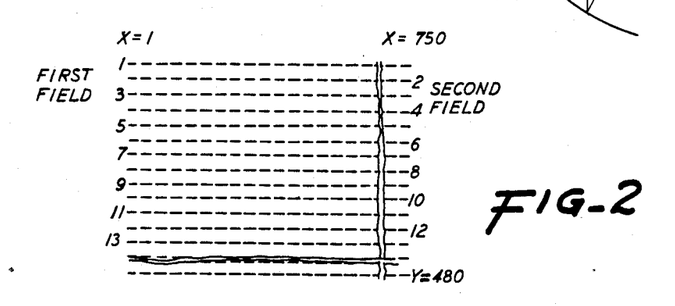
FIG. 2 illustrates an NTSC standard TV pixel matrix.

One of the difficulties in using TV cameras or the like to analyze keratographs or corneas is the need to digitize an NTSC-standard TV image which comprises an array, shown in FIG. 2, of approximately 480×750 image points or pixels (each pixel being digitized to 6–8 bits of brightness resolution), approximately 360 kilobytes of image information. Furthermore, the TV imaging is performed at a scan rate of 30 frames per second and 525 lines per frame, for an overall scan rate of 15,750 lines per second. To suppress flicker, odd lines are scanned first (top to bottom) as one field and the even lines are scanned as a second field and interlaced with the odd lines. Effectively, then, there are two fields (one even/one odd) per frame. Automated processing of the TV image of a keratograph or cornea could be expected to require the digitization of the approximately 360,000 bytes of image information. In addition, such processing must contend with the high scan rate of the horizontal, vertical and field signals which are associated with the video image.

Accordingly, it is an object of the present invention to provide a system which is adapted to the above TV imaging constraints and which fully, quickly and automatically analyzes information of the type provided by keratographs.

It is another object of the invention to perform such enhanced analysis using keratographs.

It is still another object of the present invention to provide a system which provides such enhanced analysis of keratograph-type information and does so on a real time basis, directly from the cornea.

In one aspect, the system of the present invention comprises a video camera; means for positioning a keratograph before the camera; a monitor for displaying an image of the keratograph; a computer for converting digitized video information to numeric measurements and for correcting digitized video information; and an interface circuit for digitizing selected regions of the keratograph and transferring the associated data to the computer one scan line at a time.

In another aspect, the system includes a computer monitor adapted for displaying the numeric measurements.

In still another aspect, the above system includes a microscope which interfaces optically with the video camera for projecting a ring image on a cornea to thereby provide real time analysis of the cornea.

In still another aspect, the present invention relates to a method for determining the topography of a corneal surface, by providing a video corneal image comprising a matrix of scan lines and superimposed reference curves such as Placido rings or mires; digitizing the image matrix one scan line at a time for determining the intersectional position of the reference curves along at least one selected axis; verifying the accuracy of the detected reference line positions by displaying the reference line positions on the video image; and selectively positioning display cursors at the correct reference line position on the image for controlling selected correctional movement of the detected reference line positions.

These and other aspects of the present invention are described in conjunction with the following drawings in which.

DETAILED DESCRIPTION OF THE INVENTION

Figure 1:
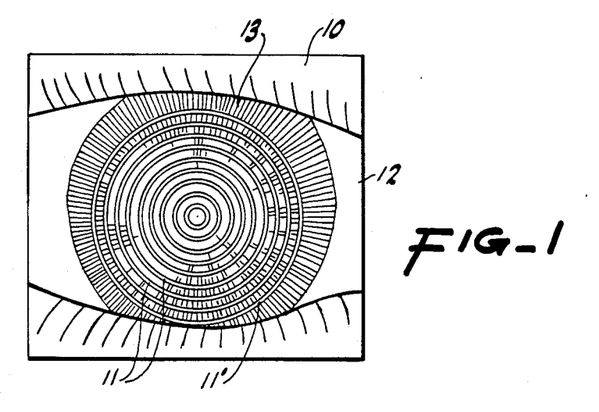
FIG. 1 is a representation of a corneal keratograph taken using a Corneascope.

As mentioned, the keratograph 10 shown in FIG. 1 inherently includes specific, accurate information concerning the photographed eye 12 and, especially, of the cornea 13. The keratograph provides permanent evidence of the condition of the eye and cornea based upon the color and description of features provided therein. In addition, and most pertinent here, the Placido rings 11—11 superimposed on the cornea 13 contain information as to the contour of the cornea.

Figure 3:
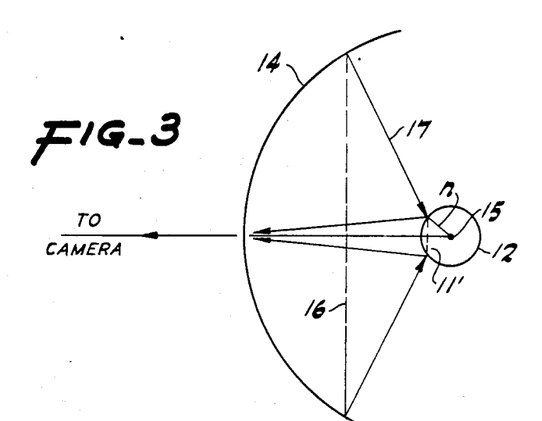
FIG. 3 illustrates diagramatically the relationship of the Corneascope Placido disk and a keratograph ring which provides the dimension of the corneal radius from a determination of the diameter of an associated ring.

Referring also to FIG. 3, during the use of the Corneascope as described in U.S. Pat. No. 3,797,921 to provide a keratograph of the eye and cornea, the patient's head and eye 12 are positioned relative to the spherical Placido disk reflecting screen 14 of the Corneascope so that the center of curvature 15 of the cornea is substantially coincident with the center of curvature of the screen 14. With this positional relationship, light from the outermost circle 16 of the reflecting screen 14 is reflected off the eye as shown by lines 17—17 and provides the resulting outermost ring 11' of the keratograph which is seen by the Corneascope camera. The resulting geometrical relationships are such that the outermost circle/ring 11' has a diameter which is equal to the corneal radius r. Thus, measurement of the diameter of the outer ring 11' on the keratograph provides the corneal radius. The fast accurate measurement of these ring dimensions is the primary aim of the present invention.

Figure 4:
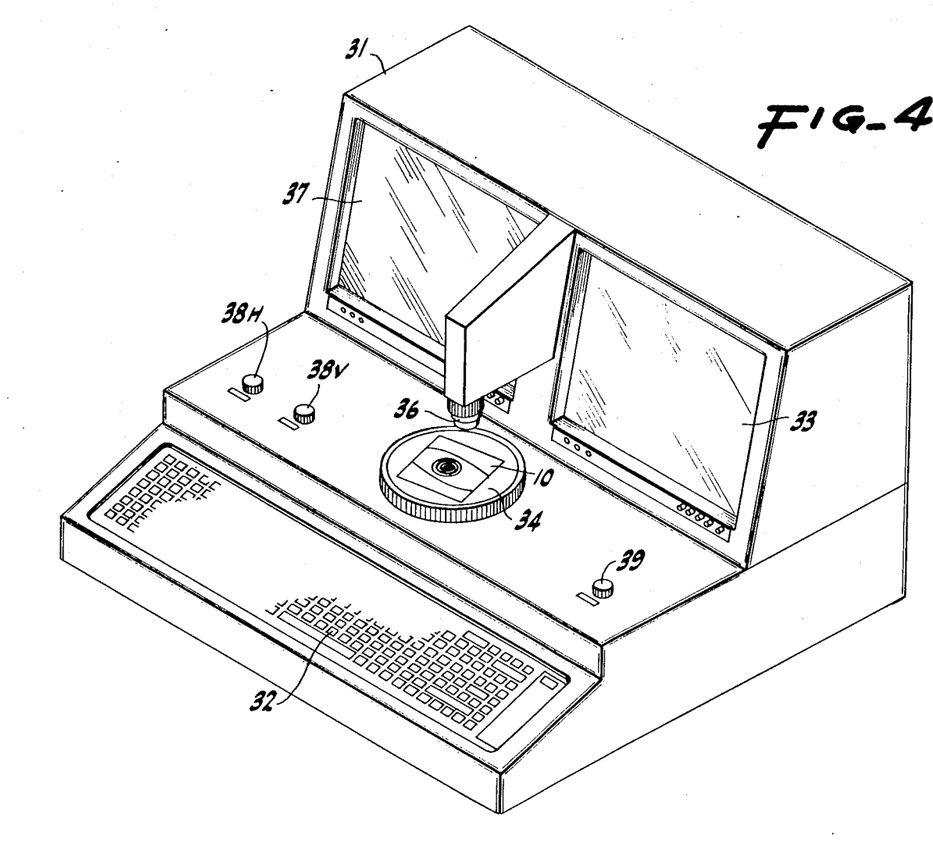
FIG. 4 is a representation, in perspective, of a console which embodies the keratograph autoscanner system of the present invention.

A unitary arrangement 30 for the keratograph autoscanner system is shown in FIG. 4. Console or cabinet 31 contains the system computer including standard keyboard 32 and computer video monitor 33. The keratograph 10 is placed on a rotatable turntable 34 and its image is obtained by TV camera 36 and displayed on keratograph image monitor 37 along with various positional and analytical information. The console also includes a pair of control knobs 38H and 38V which are used to position horizontal and vertical screen limit cursors adjacent to the outermost keratograph ring 11' to define for the computer the area which is to be analyzed. An edit control knob 39 is used to position editing cursors which are used to correct erroneous ring information, as described in detail subsequently. In addition, the computer system interfaces with a printer 35 (FIG. 5) in conventional fashion for providing a permanent record of the information obtained from the keratograph.

Figure 5:
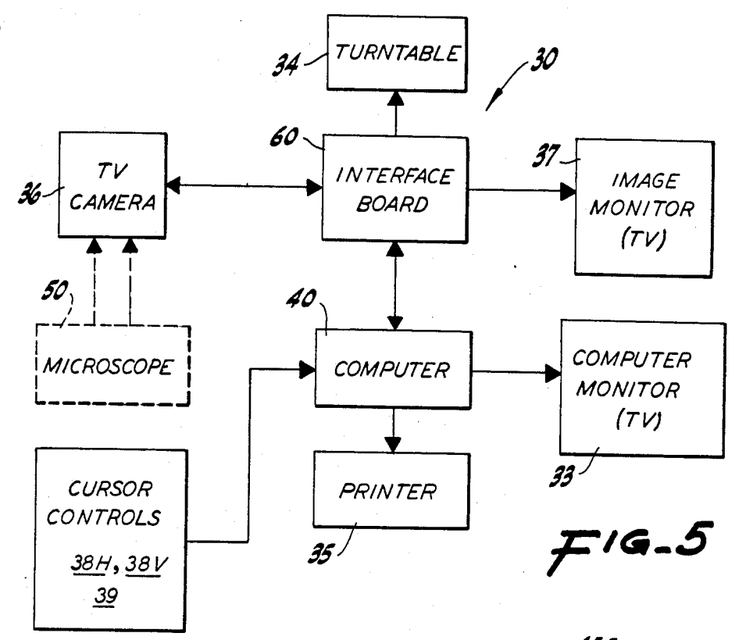
FIG. 5 is a block diagram illustrating the major components of the keratograph autoscanner system.
Figures 6, 7, 8:
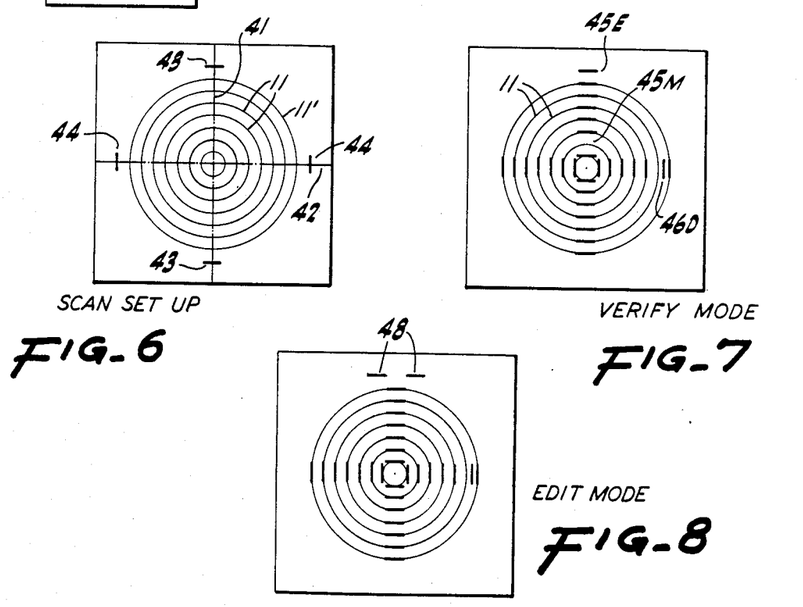
FIGS. 6 through 8 are representations of monitor images on the keratograph autoscanner system during scan set-up, verify and edit modes of operation.

Referring to FIG. 5, the overall organization of the keratograph autoscanner is controlled by the computer system and an interface board, designated respectively by the general reference numerals 40 and 60. The computer preferably is a small general purpose computer such as the Apple IIe or other similar computer. Briefly, the analysis performed by the system 30 involves determining the position of the keratograph rings 11—11 along two vertical and horizontal meridians and along two oblique meridians, in millimeters of radius or diopters. This analysis involves four primary modes of operation of the system 30: scan set-up; scan (digitization and analysis); verification; and editing. Initially, as shown in FIG. 6, in the scan set-up sequence the keratograph 10 is positioned on the turntable 34 in alignment with the TV camera so that vertical 41 and horizontal cross-hairs 42 are superimposed over the image of the keratograph on the monitor 37. The limit cursor control knobs 38H-38V are then used to position a pair of vertical limit cursors 43—43 and horizontal limit cursors 44—44 on the respective vertical and horizontal meridians just outside the outer ring 11' to electronically define for the computer the limits of the area which is to be analyzed.

The interface board 60 then scans and digitizes the keratograph image for use by the computer 40 in calculating the position of the rings along the meridians.

Figure 13:
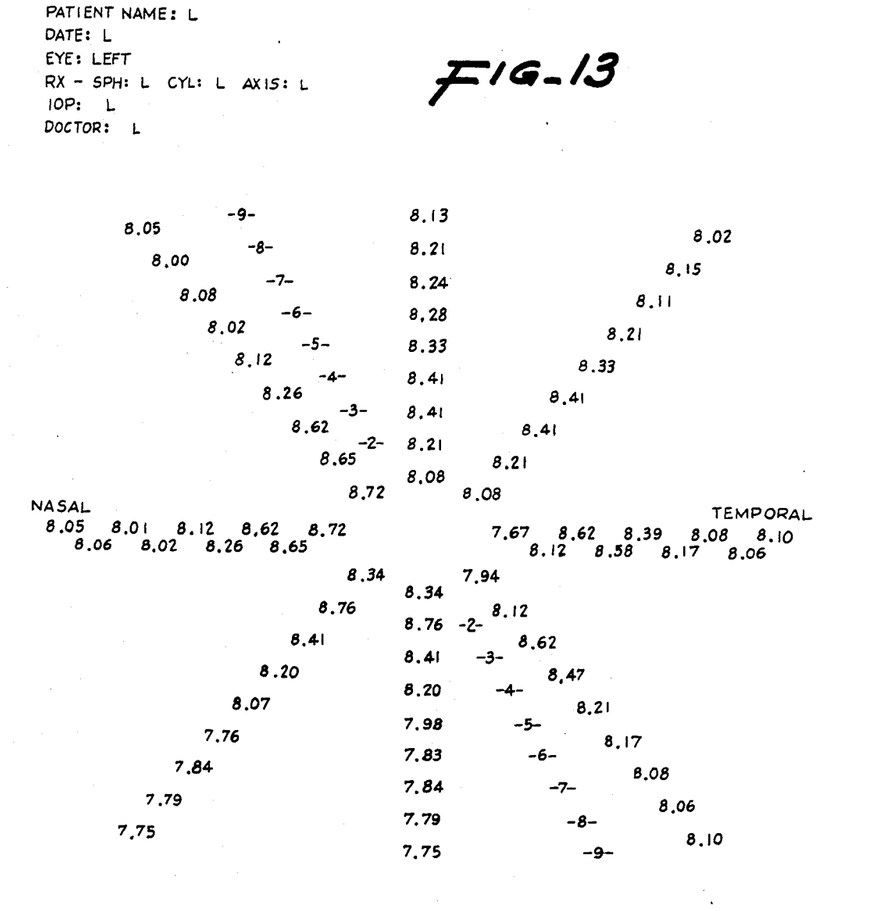
FIG. 13 illustrates the keratograph positional data displayed on the computer monitor.

Next, in the verify mode, vertical verification cursors 45—45 and horizontal verification cursors 46—46 are displayed on image monitor screen 37 at the detected ring intersections along the main meridians to provide a check on the correct positioning of the nine rings along the meridians (FIG. 7). The edit control knob 39 is then used to selectively position edit cursors 48—48 along the meridians for repositioning, adding or deleting rings 11—11 as necessary to correct any errors in the system detection of the keratograph (FIG. 8). The turntable 34 is then rotated 45° and the scan set-up, scan, verify and edit operations are repeated for the oblique meridians. The resulting seventy-two data points (nine rings twice intersecting each of four meridians) are then available at the computer monitor 33 as shown in FIG. 13 and at printer 35, in millimeters (as shown) or diopters.

The interface board 60 is formed on a printed circuit board for insertion into the computer 40 (typically, the actual connection is via a cable outside the computer). A working embodiment of the interface circuit is shown in the detailed block diagram of FIG. 9. The interface circuit 60 receives video signals from the TV camera 36 which is focused on the keratograph 10 held in the console turntable 34, and digitizes the image for processing by the computer 40. The TV camera 36 is an NTSC black and white composite video TV camera, preferably a full interlace standard video, solid-state CCD type such as Pulnix Model No. TM34. A CCD camera is preferred over the vidicon type because of the former's greater dimensional stability (lesser line width sensitivity) to line voltage and temperature fluctuations. One-volt signals from the camera 36 are input to the precision DC restoration circuit 61 and the level detector and logic circuit (sync separator) 62. The main reason for DC restoration 61 is to establish a reference for the analog/digital converter section.

Figure 9:
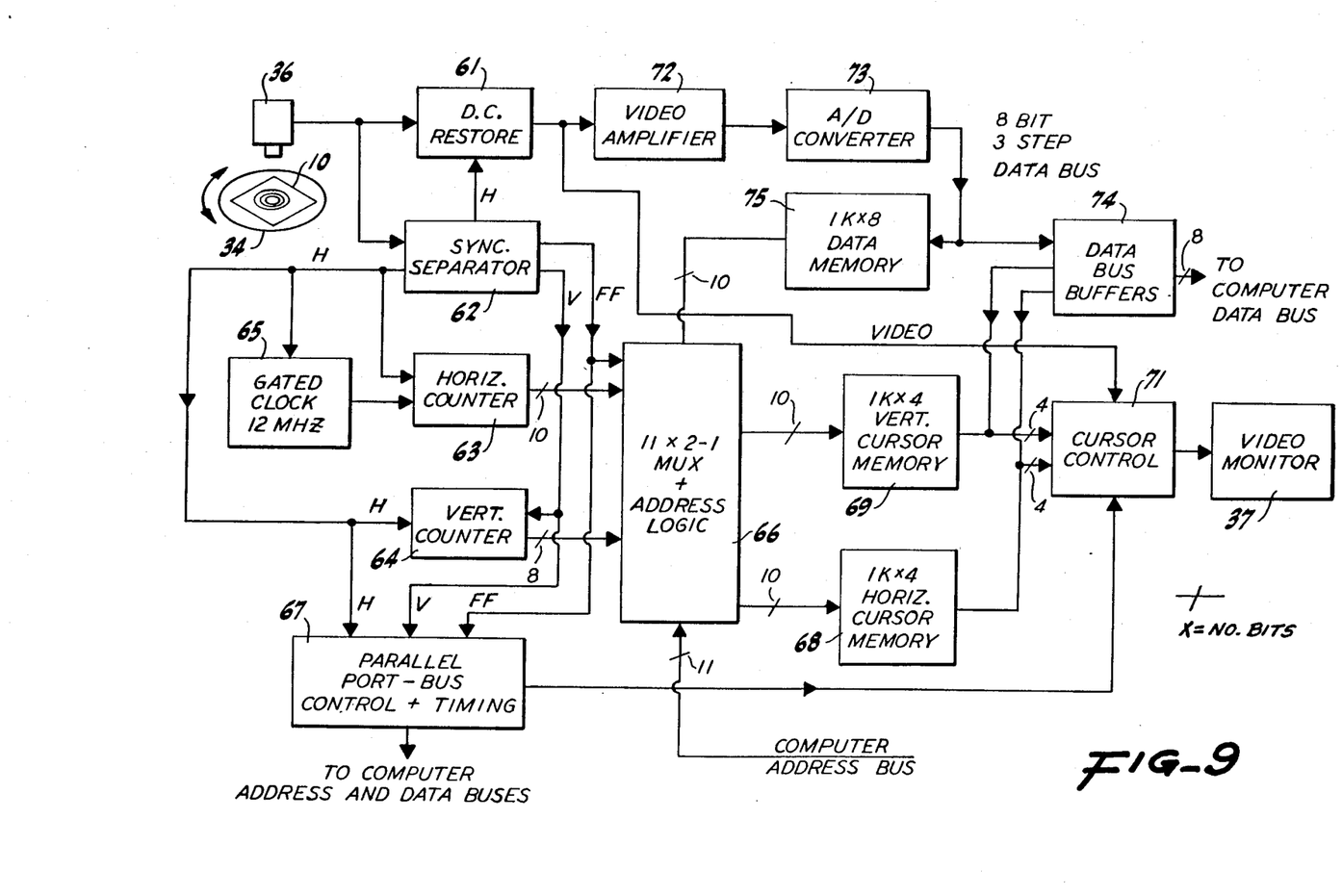
FIG. 9 is a detailed functional block diagram of the computer interface board shown in FIG. 5.

The DC restore circuit 61 establishes a ground/reference level for the video signals, which are then applied to cursor control logic chip 71 (along with the horizontal and vertical location of the cursor) to provide a keratograph image at video monitor 37.

The camera signals are separated by the sync separator 62 into vertical, horizontal and first field signals. The first field and horizontal and vertical sync signals are input to the horizontal and vertical counters 63 and 64 for assigning a horizontal and vertical address to every location in the video screen (FIG. 2). Specifically, a 74S124 gated oscillator clock generator chip 65 is gated by the horizontal sync signal and is reset to restart counting at the beginning (left) of every horizontal scan line of the video screen. Three 74LS161 horizontal counters identified generally as 63 are driven by the clock 65 and assign a 10 bit horizontal position word to every position in the video screen. The 74LS393 vertical position counter 64 is reset to zero by every vertical sync pulse and counts by two to provide a count for the even/odd fields. The first field sync signals are used by the vertical counter 64 as even/odd least significant bits (LSB) and are combined with the 7-bit vertical counter to provide an 8-bit vertical position word. The multi-bit horizontal and vertical address buses, as well as the computer address bus, are applied to nine 74LS157 QUAD 2-1 multiplexers and address logic circuits, identified generally as 66, which selects from the computer address bus and the horizontal and vertical address buses to provide shared access to the same memory. The sync separator 62 also applies horizontal, vertical and first field sync pulses to a parallel port-bus control and timing circuit 67 which allows the computer 40 to selectively blank out the cursors which are applied to the computer 35 address and data cursor control logic circuit 71.

The mux/logic circuit 66 permits cursor creation (or correction) during the scan-set mode (editing mode). During the scan-set mode, the cursor limit controls 38H, 38V are used to position the limit cursors 43—43 and 44—44 (FIG. 6) via the standard computer game paddle inputs. The vertical and horizontal limit cursor positions are written into the horizontal and vertical cursor memories 68 and 69 over the computer data bus. The cursor control circuit 71 uses simple combinatorial (AND) logic to combine the horizontal and vertical cursor addresses with video signals from the DC restore 61 to superimpose the images of the cursors 43—43 and 44—44 on the keratograph image on the video monitor 37 as the control knobs are adjusted.

The above-mentioned horizontal cursor memory 68 is a medium speed 1K×4 random access memory (RAM) in which the four bits contain the following information:

| | |
|---|---|
| 1 | Positions for main horizontal cursors. |
| 2 | Positions for the auxiliary horizontal cursors. |
| 3 | Limits for the main vertical cursors. |
| 4 | Limits for the auxiliary vertical cursors. |

The second bit also controls the write enable for the video data memory 75, i.e., digitizing of the horizontal scan lines (FIG. 2).

The vertical cursor memory 69 is a high speed 1K×4 RAM in which the four bits contain the following information:

| | |
|---|---|
| 1 | Limits for the main horizontal cursors. |
| 2 | Limits for the auxiliary horizontal cursors. |
| 3 | Positions for the main vertical cursors. |
| 4 | Positions for the auxiliary vertical cursors. |

To effect digitization of the keratograph image, the approximately one-volt video signals from the DC restore 61 are amplified by high speed LH0024 operational amplifier 72 to provide a 5–8 volt peak-to-peak input to analog-to-digital converter 73 via an LH0033 buffer amplifier (not shown). The A/D converter 73 comprises a pair of six-bit flash converters or a single eight-bit flash converter which digitizes the amplified video signal. In the horizontal data gathering mode, the mux/logic circuit 66 alternately shifts between the address counters and the computer address bus at the rate of 30 frames per second in accordance with the scan rate of the video system to digitize one scan line at a time and write the associated information into the video data buffer memory 75, a 2149-2 high speed 1K×8 static RAM, then transfer the information into the computer memory after each line is digitized. In the vertical data gathering mode, the mux/logic 66 alternates access to the buffer memory between the A/D circuit and the computer bus at the rate of 15,750 times per second, transferring one selected pixel value per scan line into the computer memory each 63.5 microseconds. This multiplexed, fast scan rate approach permits a small storage capacity in the video memory 75 and avoids having to digitize all 360,000 screen positions at one time for block transfer to computer memory. After computer analysis (discussed below) determines the ring positions along each horizontal scan line and the corresponding cursor intersections on the horizontal and vertical meridians (cross-hairs), the mux/logic circuit 66 shifts to the computer address bus and the horizontal and vertical verification cursor addresses are written into the cursor memories 68 and 69 for display on the video monitor 37. That is, the memories 68 and 69 are written after the digitization and analysis of all of the scan lines.

It should be noted that the signal quality of relatively low and medium cost video cameras typically is such that freezing (digitizing) one frame at a time, as is done here, can result in a high noise level. However, through the speed of data transfer which is afforded by interface circuit 60, sequential horizontal and vertical real time image averaging can be done in the computer. In the present implementation of the system, as many as 256 frames can be averaged at a time to average out the noise.

Figures 10, 11:
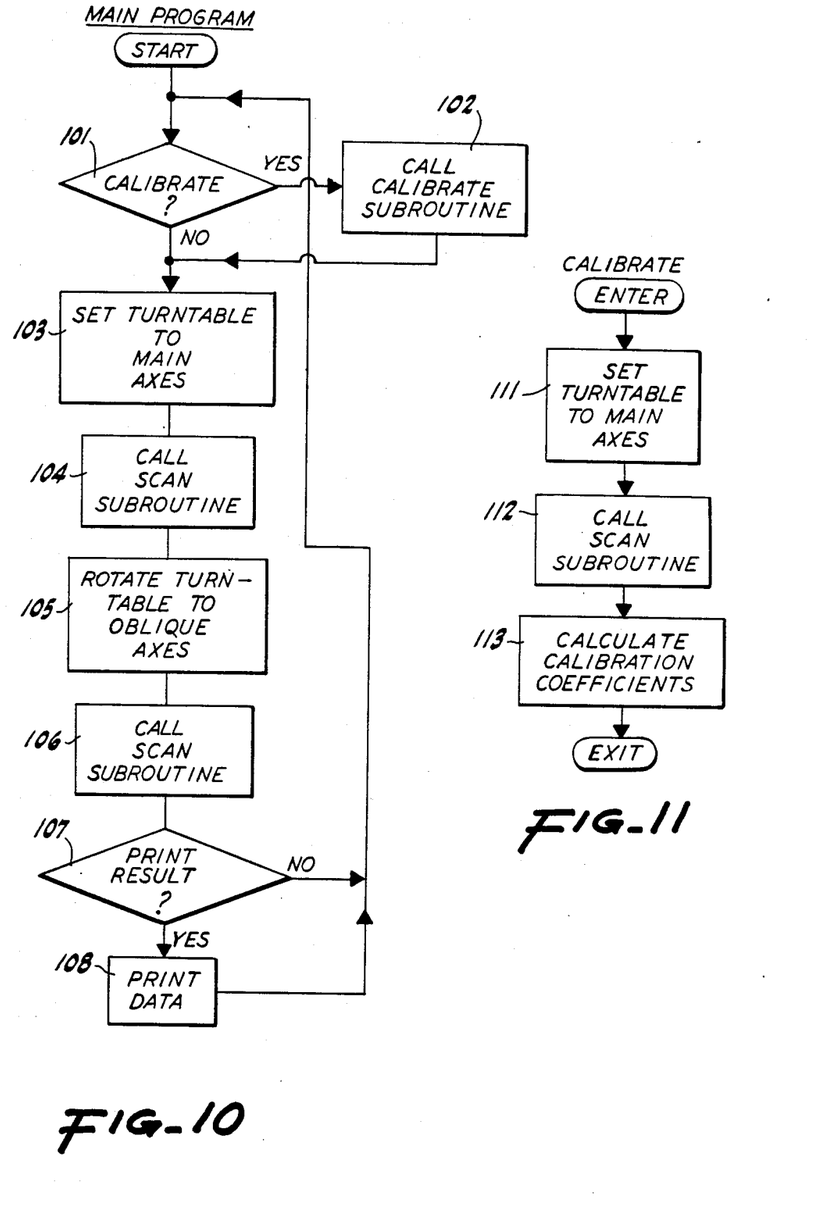
FIGS. 10, 11 and 12 are flow charts of the main computer program and the calibrate and scan sub-routines, respectively.
Figure 12:
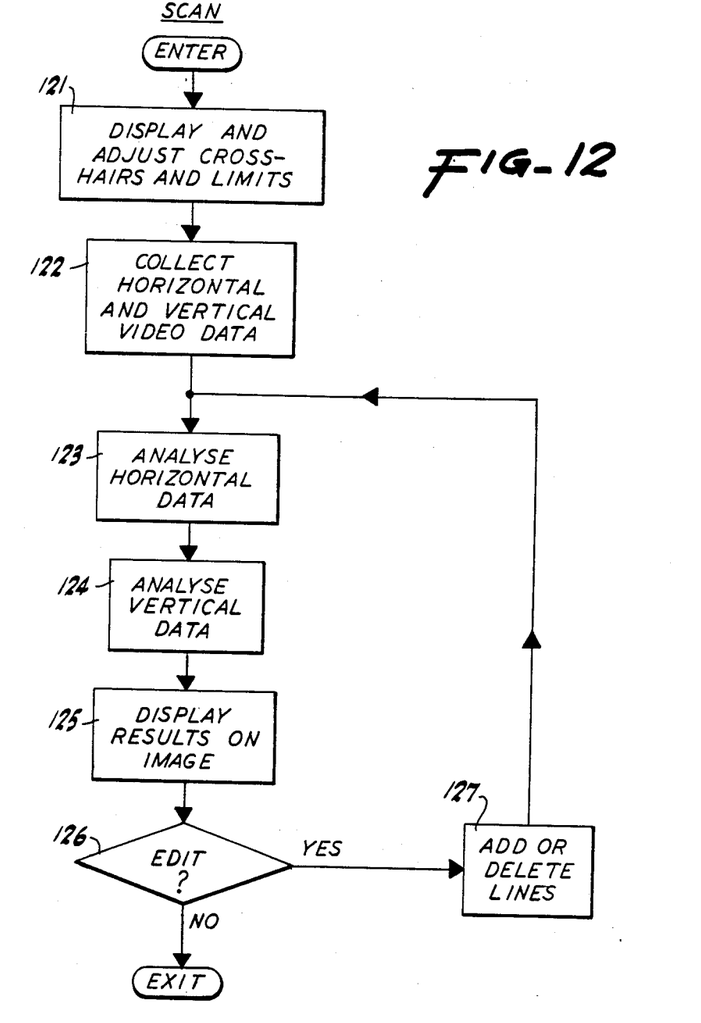

The present computer software program which is used to analyze the keratographs is summarized in FIGS. 10–12. Program steps are referenced parenthetically in the following discussion. Referring initially to the main program flow chart in FIG. 10, each time the autoscanner is turned on, typically once at the beginning of each day, the system is calibrated to a standard keratograph of a steel or plastic ball of known radius (102). The rings 11—11 on this standard keratograph are measured using the autoscanner system 30 and are stored in the system computer 40 for use in analyzing keratographs of the human cornea. The calibration procedure is essentially identical to the procedure used in analyzing the human keratograph, discussed below, except that the symmetry of the standard ball eliminates the need for measurements along the oblique meridians. Because of the similarity to the human keratograph analysis, the standard calibration procedure need not be disclosed at length at this point. Instead, reference is made to the following explanation.

After calibration, and referring also to FIGS. 4 and 6, the keratograph of a patient's eye is positioned on turntable 34. The keratograph 10 is centered on the crosshairs 41 and 42 and maintained in the centered position by retaining clips (not shown) on the turntable. The computer and interface (not shown) operate the turntable motor (not shown) to rotate the turntable and keratograph into alignment with the main north-south axes (103), then the scan subroutine (104; FIG. 12) is called up by the main program to initiate the scan-set, scan (digitize and analyze), verify and edit routines. At this point, the interface board 60 effects display of the keratograph 10 and the rings 11—11 on the monitor 37 and the computer 40 superimposes vertical cross-hair 41 and horizontal cross-hair 42 on the keratograph image. Next, the computer scan field is defined using console control knobs 38H–38V to set the vertical limit cursors 43—43 and horizontal limit cursors 44—44 just outside the outer rings 11' (typically the ninth ring) of the keratograph image along the respective vertical and horizontal cross-hairs (121). The limit cursors 43 and 44 addresses are written into the computer cursor memory to limit the computer field of search for the rings 11—11 to the distance within the limit cursors along the respective horizontal and vertical meridians. See FIG. 6.

After the position and cursor limit-setting sequences (121), a keystroke "S" is entered to implement the next, scan mode (122–124). Here, as discussed previously, the interface board 60 digitizes the keratograph image one scan line at a time for storage in the computer 40 (122) then analyzes the horizontal and vertical data to determine the intersection of the rings along the horizontal and vertical cross-hairs 41 and 42. The key feature of the ring detection algorithm is a peak detection test. Rings appear as intensity peaks along the horizontal scan line matrix. The peaks can be detected by detecting the change in slope, from positive to negative, by differentiation using a mathematical high pass filter. In a working embodiment, there is used a finite impulse response (FIR) non-causal high pass filter of formula $f=(2x_{n+1}+x_n-x_{n-1}-2x_{n-2})$. The computer program makes this determination for every point in the video output signal along the horizontal cross-hair, then determines the nine largest spikes in each of the right and left guadrants. That is, the computer determines the probable location of the eighteen ring intersections along both the horizontal cross-hair or meridian (123) and the vertical cross-hair or meridian (124). The computer 40 then writes the horizontal and vertical cursor/ring addresses into the memories 68,69 for verification display on the video monitor 37 (125).

Upon completion of the computer analysis and memory storage, the computer system 40 automatically displays the thirty-six verification cursors at the positions along the horizontal and vertical cross-hairs/meridians where the computer has detected a ring 11—11. That is, and assuming accurate detection of all nine rings 11—11 along each of the meridians/cross-hair quadrants, eighteen vertical verification cursors 45—45 and eighteen horizontal verification cursors 46—46 are displayed on the screen by the computer, in place of the cross-hairs, superimposed over the image of the keratograph. This permits comparison of the cursors with the keratograph rings, as shown in FIG. 7, to determine if each ring has been detected and analyzed correctly.

One of the key features of the autoscanner system 30 is the ability to correct for missing/added/displaced rings. For example, in the verification display mode shown in FIG. 7, in the vertical quadrant the computer detected an extra ring indicated by ring cursor 45E outside the outermost ninth ring, and missed a ring as indicated by the absence of a ring cursor at 45M. In the right hand quadrant, the eighth cursor ring was displaced as indicated by the cursor position denoted 46D. Typically, such errors result from deficiencies in the film or developing process, the lighting, covering of the rings by eyelashes, etc. In any event, entry of keystroke (E) places the computer in the edit mode (127) for correcting such detection errors.

Referring also to FIG. 8, in the edit mode, extra edit cursors 48—48 are displayed on the screen and are selectively positioned using edit cursor console control knob 39 (FIG. 4). By moving an edit cursor 48 to a location (45E, 45M, 46D, FIG. 7) and depressing the A or D key, a cursor is added or deleted at that location. Thus, the edit cursors and the appropriate keystroke are used to delete the extra cursor at 45D, add the missing cursor at 45M, and reposition (delete and add) the cursor at 46D. The D keystroke zeroes the peak magnitude value at the incorrect cursor/ring location, while the A keystroke adds a sufficiently high magnitude value at the empty location to ensure inclusion of the location as one of the eighteen peaks. The computer then rewrites the cursor memories 68 and 69 with the corrected ring addresses to complete the editing subroutine (127).

Upon completion of editing, an "X" keystroke is entered to display the corrected verification cursor pattern on monitor 37 and to re-enter the main program. The computer 40 rotates the turntable 45° to position the keratograph for measuring the oblique meridians (105). At this point, the scan subroutine is again called up (106) and the entire measurement procedure described above for the main meridians is repeated for the oblique meridians. That is, the limit cursors are established along the cross-hairs of the positioned keratograph image scan set-up; the keratograph is digitized and analyzed (scan mode); then the verification cursors are displayed on the monitor 37 (verify mode); and the ring information is corrected as required (edit mode).

Following the edit mode for the oblique meridians, upon entry of the "X" exit keystroke, the computer effects the display on monitor 37 of the 36 cursors for the oblique meridians. The ring information is displayed in millimeters (FIG. 13) or, optionally, can be displayed in diopters. If the measurements are to be permanently recorded, a "P" keystroke entry activates printer 49 for providing a hard copy printout (108). Typically, the printer is a free-standing conventional small dot matrix computer printer such as the EPSON MX-80. After entering the keystroke "P", various information may be entered for the permanent records such as the patient's name, doctor's name, additional optical measurements, etc. After the printout is completed, the computer monitor 33 displays a prompt indicating to the operator that the system is ready for the next keratograph analysis.

As mentioned previously, the calibration procedure which is performed when the autoscanner system is first turned on prior to implementing a measurement procedure for a human keratograph, is identical to the measurement procedure for a keratograph except that oblique measurements are not taken because they would be identical to the measurements along the main meridians for the uniformly spherical ball. Thus, only one set of meridian measurements is required and the turntable is not rotated. The simple calibration subroutine is described by way of flow chart in FIG. 11. That is, upon entry into the subroutine, the turntable 34 is set to the main axes or meridians (111); then the scan subroutine is called up (112) for digitizing, analyzing and storing the ring measurements for the standard keratograph.

Finally, the resulting horizontal and vertical ring-/cursor data is used to calculate the calibration coefficients (113). This calculation creates an array of numbers proportional to the positions of the calibration rings. The numbers are used to relate the rings on patient's keratograph to the calibration standard to determine the true dimensions of the patient's eye. In particular, the radius of a patient's cornea associated with the $n^{th}$ ring 11 is given by $$r_n = r_{cn} \frac{d_n}{d_{cn}}$$

where $d_n$ is the distance between the center of the ring pattern on the patient's keratograph 10 and the intersection of the $n^{th}$ keratograph ring 11 with a specified meridian; $d_{cn}$ is the corresponding distance for the $n^{th}$ ring on the keratograph of the calibration ball; and $r_{cn}$ is the radius of the calibration ball. The value $r_{cn}$ is known. The measurements $d_{cn}$ are obtained during the calibration scan subroutine (123 and 124). The calibration coefficient is calculated by the computer from $r_{cn}/d_{cn}$ (113). The resulting calibration coefficient is then used by the computer along with the values $d_n$ determined during the keratograph scan subroutine (123 and 124) to calculate $r_n$ as $(r_{cn} d_n)/d_{cn}$ and display the resulting ring values in millimeters (FIG. 13) or diopters, as described above.

To summarize the overall software program described by the flow chart in FIG. 10, initially, the computer calls up the calibration subroutine, if necessary (101); then, after calibration, sets the turntable to the main axis (103); and calls the scan subroutine (104) for digitization and analysis of the keratograph. Referring to FIG. 12, the scan subroutine is the critical routine in the keratograph analysis procedure and involves setting the cursor limit information (121); collecting and storing the digitized, horizontal and vertical video data from the interface 60 (122); analyzing the horizontal data (123) and vertical data (124) and storing the cursor addresses corresponding to the detected ring positions; displaying the verification cursor information on the screen, FIG. 8 (125); and, as required, editing the cursor/ring information, FIG. 8 (126). If editing is required, i.e., if it is necessary to add or delete cursors and the associated ring information, the analysis and verification stages are repeated prior to return to the main program. Upon exiting the scan subroutine for the main axis, the computer effects a 45° rotation of the turntable to the oblique axis (105); then re-enters the scan routine (106), FIG. 12, performs the aforementioned digitization, analysis and editing, this time for the oblique axis, then again exits to the main program. Then, the measurement results may be printed (108).

As shown in FIG. 5, an operating microscope system 50, e.g., of the type described in Reynolds allowed U.S. patent application, Ser. No. 336,920 now U.S. Pat. No. 4,490,002, issued Dec. 25, 1984, may be added to the autoscanner system. This system provides real time analysis of a patient's cornea and superimposed Placido ring pattern, e.g., during an operation. The use of an operating microscope is similar to the above-described keratograph analysis with the following exceptions. Only one meridian is analyzed at a time since ring images are available only on one meridian at a time. The cross-hairs used for centering the image are themselves moved rather than having to move the camera on the patient (rather than moving the photo, as in the autoscanner). Only the major meridians are analyzed (not oblique meridians). The results of the analysis are not immediately printed out; rather, the ring/cursors are left on the screen so that they can be superimposed upon the image of the patient's eye at any time for the surgeon's reference. As an option, a manual input can be made to the computer to generate ring patterns for any desired spherical curve if it might be desirable to alter the original curvature of the patient's cornea. The operating microscope and the autoscanner are both calibrated by using standard steel or plastic balls of known diameter (or a keratograph of a steel ball in the case of the autoscanner).

Thus, there has been described an automated system for providing fast, accurate measurements of keratographs. This system features the use of a fully digitized real time video image rather than a freeze frame image, and image editing by way of image cursors which verify and inititate correction of ring detection. In the use of the system as a real time monitoring system (for example, using an operating microscope to monitor surgical-implemented changes to the cornea and eye) the cursors serve as reference points. The unique interface design permits operation with only 2048 bytes of memory rather than the 360,000 bytes which would be expected by a conventional system. The system computer software provides a fast, efficient ring detection algorithm, editing features, and provides real time image averaging with inexpensive hardware and with good image noise rejection.

What is claimed is:

1. A system for analyzing an image of an object which includes superimposed contour lines, comprising video means for generating electronic signals representative of the image by line scanning; means for digitizing the video signals a scan line at a time; computer means responsive to the digitized video signals for storing the image in the form of the digitized scan line data, and being adapted for detecting and storing intersection address locations of the contour lines along selected reference lines; a monitor controlled by the video means and stored addresses for displaying the image and intersection locations; the computer means being further adapted to detect the intersection addresses based upon highest-magnitude peak values of the digitized video signals along the selected reference lines, and to correct intersection addresses by selectively writing in high or low values; and adjustable correction control means interfacing with the computer means for selectively positioning correction cursors on the monitor image to thereby generate the address of the intersection correction.

2. The system of claim 1, the adjustable correction control means including a game paddle interface circuit for selectively positioning said correction cursors on the monitor image.

3. The system of claim 1, further comprising a printer responsive to the computer for printing the intersection locations.

4. The system of claim 1 wherein the video means comprises a microscope and a video camera adapted for receiving optical images from the microscope.

5. A system for analyzing an image of an object which includes superimposed contour lines, comprising video means for generating electronic signals representative of the image; means for digitizing the electronic signals; computer means responsive to the digitized electronic signals for detecting and storing the intersection address locations of the contour lines along selected reference lines based upon the highest-magnitude peak values of the digitized electronic signals along the selected reference lines; a monitor controlled by the video means and stored addresses for displaying the image and intersection locations; correction control means interfacing with the computer means for selectively positioning correction cursors on the monitor image at selected locations corresponding to missing or incorrectly positioned intersection locations; and wherein the computer means is adapted for correcting intersection addresses by selectively writing in high or low values at the addresses of said selected locations.

6. The system of claim 5, the computer means including a game paddle interface circuit and the system further comprising adjustable correction control means interfacing with the computer means game paddle interface circuit for selectively positioning correction cursors on the monitor image to thereby generate the address of the intersection correction.

7. The system of claim 5, further comprising a printer responsive to the computer for printing the intersection locations.

8. The system of claim 5 wherein the video means is a video camera adapted for line scanning and wherein the digitizing means is adapted for digitizing a scan line at a time and transferring the digitized scan line data to the computer memory.

9. The system of claim 5 wherein the video means comprises a video camera adapted for line scanning and a microscope adapted for transferring images having contour rings superimposed thereon to the video camera; and wherein the digitizing means is adapted for digitizing a scan line at a time for transferring the digitized scan line data to the computer memory.

10. A system for analyzing an image of an object which includes superimposed contour lines, comprising a video camera for generating electronic video signals representative of the image by line scanning; means for digitizing the video signals a scan line at a time; computer means including a memory responsive to the digitized video signals for storing the image in the form of the digitized scan line data, and being adapted for detecting and storing the intersection addresses of the contour lines along selected reference lines based upon the highest-magnitude peak values of the digitized video along the selected reference lines; a monitor controlled by the video camera and stored addresses for displaying the image locations; adjustable correction control means interfacing with the computer means for selectively positioning correction cursors on the monitor image to thereby generate the address of the intersection corrections; and an interface circuit comprising the signal digitizing means; buffer storage for transferring the digitized scan line data to the computer memory; intersection address storage means for storing the intersection addresses of the contour lines along the selected reference lines and for storing the corrected intersection addresses; a logic circuit adapted for selectively receiving the video signals and the intersection addresses to responsively superimpose the address locations on the monitor image; and a multiplex circuit responsive to field signals and horizontal and vertical sync signals inherent to the video image for controlling transfer of the digitized scan line data to the computer means and transfer of the intersection address data to the intersection address storage means.

11. The system of claim 10, further comprising a printer responsive to the computer for printing the intersection locations.

12. The system of claim 10 wherein the video camera further comprises a microscope and the video camera is adapted for receiving optical images from the microscope.

13. The system of claim 10 wherein the video camera further comprises a microscope having contour rings superimposed therein and being adapted for transferring images to the video camera.

14. A method of using a video camera and a computer to determine the topography of a corneal surface, comprising using the camera to provide a video corneal image comprising a matrix of scan lines and superimposed reference curves such a Placido rings or mires; digitizing the image matrix one scan line at a time; determining the intersectional position of the reference curves along at least one selected axis; checking the accuracy of the detected reference curve positions by displaying the reference curve positions on the video image; selectively positioning correction cursors at the correct reference curve positions on the image for controlling correctional movement of the detected reference curve positions; storing the address of the correction cursors in the computer as the corrected reference curve address; and displaying the corrected video corneal image.

15. The method of claim 14 wherein the video corneal image is of a keratograph.

16. The method of claim 14 wherein the corneal image is a real time image provided by optically reflecting the reference curves from a cornea.

* * * * *